(12) United States Patent
Zivkovic

(10) Patent No.: US 8,917,631 B2
(45) Date of Patent: Dec. 23, 2014

(54) SYSTEM AND METHOD FOR SHARING INFORMATION BETWEEN TWO OR MORE DEVICES

(75) Inventor: Aleksandar Zivkovic, North York (CA)

(73) Assignee: Ortsbo Inc., Markham, Ontario (CA)

(*) Notice: Subject to any disclaimer, the term of this patent is extended or adjusted under 35 U.S.C. 154(b) by 551 days.

(21) Appl. No.: 13/209,520

(22) Filed: Aug. 15, 2011

(65) Prior Publication Data
US 2012/0045002 A1 Feb. 23, 2012

Related U.S. Application Data

(60) Provisional application No. 61/402,006, filed on Aug. 23, 2010.

(51) Int. Cl.
*H04L 29/00* (2006.01)
*H04L 29/06* (2006.01)
*G06F 21/33* (2013.01)

(52) U.S. Cl.
CPC .......... *H04L 65/4007* (2013.01); *G06F 21/335* (2013.01); *G06F 2221/2111* (2013.01); *G06F 2221/2137* (2013.01); *H04L 63/0492* (2013.01); *H04L 63/18* (2013.01)
USPC ........... 370/259; 370/349; 370/389; 709/227; 709/238; 713/168; 713/184; 726/2

(58) Field of Classification Search
None
See application file for complete search history.

(56) References Cited

U.S. PATENT DOCUMENTS

| | | | | |
|---|---|---|---|---|
| 5,115,233 A | * | 5/1992 | Zdunek et al. ................ | 370/348 |
| 5,838,461 A | * | 11/1998 | Hsieh ........................... | 358/442 |
| 5,915,239 A | | 6/1999 | Haavisto et al. .............. | 704/275 |
| 6,526,385 B1 | | 2/2003 | Kobayashi et al. ........... | 704/504 |
| 2003/0159050 A1 | * | 8/2003 | Gantman et al. .............. | 713/184 |
| 2003/0176934 A1 | | 9/2003 | Gopalan et al. ................ | 700/94 |
| 2003/0212549 A1 | | 11/2003 | Steentra et al. ............... | 704/201 |
| 2004/0001553 A1 | | 1/2004 | Steentra et al. ............... | 375/260 |

(Continued)

FOREIGN PATENT DOCUMENTS

WO WO 2010/134817 11/2010 ............. H04L 29/08

OTHER PUBLICATIONS

International Searching Authority, International Search Report and the Written Opinion for International Application No. PCT/CA2011/0000921, 10 pgs, Apr. 26, 2012.

*Primary Examiner* — Chi H Pham
*Assistant Examiner* — Shick Hom
(74) *Attorney, Agent, or Firm* — Sunstein Kann Murphy & Timbers LLP

(57) ABSTRACT

A system and method for sharing digital information between two or more devices in close proximity using a sound signal. The sending device obtains a globally unique share identifier from an information sharing system. The sending device then uploads the digital information to be shared to the information sharing system and transmits the sharing identifier to a receiving device via sound signals. The receiving device communicates the sharing identifier to the information sharing system and receives the digital information from the information sharing system. The information transferred from the sharing system can be password encrypted, the information transfer can be limited to a specified time period or the information transfer can be limited to receiving devices located within a specified geographic extent. In some embodiments of the invention, the sending device broadcasts a sound signal with a sharing identifier encoded in the sound stream and a plurality of receiving devices access digital information at the information sharing system using the sharing identifier as recovered from the sound stream.

18 Claims, 3 Drawing Sheets

(56) References Cited

U.S. PATENT DOCUMENTS

| | | | |
|---|---|---|---|
| 2005/0060741 A1* | 3/2005 | Tsutsui et al. | 725/32 |
| 2006/0271688 A1* | 11/2006 | Viger et al. | 709/227 |
| 2007/0190975 A1 | 8/2007 | Eonnet | 455/411 |
| 2007/0211579 A1* | 9/2007 | Yoshimura et al. | 369/7 |
| 2008/0086568 A1* | 4/2008 | Badt et al. | 709/231 |
| 2009/0006088 A1* | 1/2009 | Gajic et al. | 704/233 |
| 2009/0176505 A1 | 7/2009 | Van Deventer et al. | 455/456 |
| 2009/0315687 A1 | 12/2009 | Kanevsky et al. | 340/384.4 |
| 2010/0146115 A1* | 6/2010 | Bezos | 709/225 |

* cited by examiner

SYSTEM AND METHOD FOR SHARING INFORMATION BETWEEN TWO OR MORE DEVICES

This application claims priority from U.S. provisional patent application, Ser. No. 61/402,006, filed Aug. 23, 2010, entitled "System and Method for Sharing Information between Two Microcomputers that are in Close Proximity to Each Other," which is incorporated herein by reference.

TECHNICAL FIELD

The present invention relates to information transfer between computing devices, and, more particularly, to information transfer between two or more devices in close proximity using sound to initiate the transfer.

BACKGROUND

Digital information transfer among devices that contain computer processors has been common place for many years. The physical media used for such transfers have commonly included both wired and wireless media, e.g., radio frequency signals over air, electrical signals over wire, light waves over fiber optics, infrared over air, etc.

The increasing use and sophistication of mobile devices that can be easily carried by a human, e.g., smartphones, has increased the importance of easy, controlled information sharing among mobile devices that are in close proximity to one another. Because these devices may not always include all of the same hardware or software components, finding methods to easily control the transfer of digital information among heterogeneous human-borne devices has taken on increasing importance.

SUMMARY OF VARIOUS EMBODIMENTS OF THE INVENTION

In preferred embodiments of the invention, a method for sharing information among computing devices in close proximity is provided. A receiving device receives an encoded sound stream from a sending device, which is in close proximity. The sound stream includes a sharing identifier ("ID"), which the receiving device decodes from the stream. The receiving device contacts an information sharing system ("ISS") and provides the sharing ID. The ISS transfers previously stored information associated with the sharing ID to the receiving device via any convenient communication means. Thus, controlled access to digital information is provided through transfer of an identifier that requires only that the sending device and receiving device each have a microphone and a speaker. Further, the limited range of sound transmission provides a convenient method of controlling the identity of the receiving device.

In embodiments of the invention, the sending device arranges digital information sharing by contacting an ISS via a communication link and requesting a globally unique sharing ID for the digital information. The sending device then uploads the digital information to the ISS in association with the sharing ID. In preferred embodiments of the invention, the sending device can restrict digital information transfers associated with a sharing ID by time period, by location of the receiving device or by encryption of the data with an associated password and by notifying the ISS accordingly. The sending device notifies the receiving device of the restrictions on the transfers via the sound stream that includes the sharing ID. In some embodiments, metadata associated with the digital information to be shared is transferred to the receiving device via the encoded sound stream.

In other preferred embodiments of the invention, multiple receiving devices receive a sound signal broadcast from a sending device. Each receiving device can decode one or more sharing IDs from the sound stream and access the digital information from the ISS using the sharing ID. In some embodiments of the invention, the sending device that notifies the receiving devices of the sharing ID via a sound stream is different from the device that uploads the information to the ISS and secures a sharing ID. Thus, the sending device could be as simple as a device that can playback recorded sound, e.g., a tape recorder.

In other preferred embodiments of the invention, other physical media that can be effectively limited to devices in close proximity such as infrared, light waves, etc. can be used in place of sound for initiating digital information transfers between devices.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF VARIOUS EMBODIMENTS OF THE INVENTION

In preferred embodiments of the invention, digital information is transferred to a receiving device, such as a smartphone, from an information sharing system ("ISS"), where the information transferred is identified to the receiving device by a sound signal from a sending device in close proximity. Initiating the transfer using an encoded sound signal is particularly attractive because human-borne mobile communication devices commonly contain a microphone and speaker. Such transfers can be effected with a minimum of preconditioning of sound transducers. Because the sound volume is easily controlled, limiting the identity of receiving devices becomes practical. Thus, an encoded sound signal is ideal for setting up the parameters for digital information transfers among devices of varying types and manufacturers that are in close proximity.

To initiate a transfer, a sending device requests a globally unique sharing identifier ("ID") from the ISS. The sending device uses the sharing ID to upload digital information to be shared to the ISS. The sending device's speaker then emits a sound signal that encodes the sharing ID. A receiving device picks up the sound signal with its microphone. The receiving device decodes the sharing ID and communicates the sharing ID to the ISS via a communication means such as the internet, modems, wireless media, infrared, etc. The receiving device then receives a download of the digital information from the ISS over the communication means. In some embodiments of the invention, the digital information transfer may be password protected, may be limited to a specific time of day, or may be limited to receiving devices located in a specific geographic area. In some embodiments of the invention, the sending device and the device that uploads digital information to the ISS may not be the same. Thus, in these embodiments, the sending device can be any device that can reproduce sound, e.g., a tape recorder, MP3 player, etc.

Figure 1:
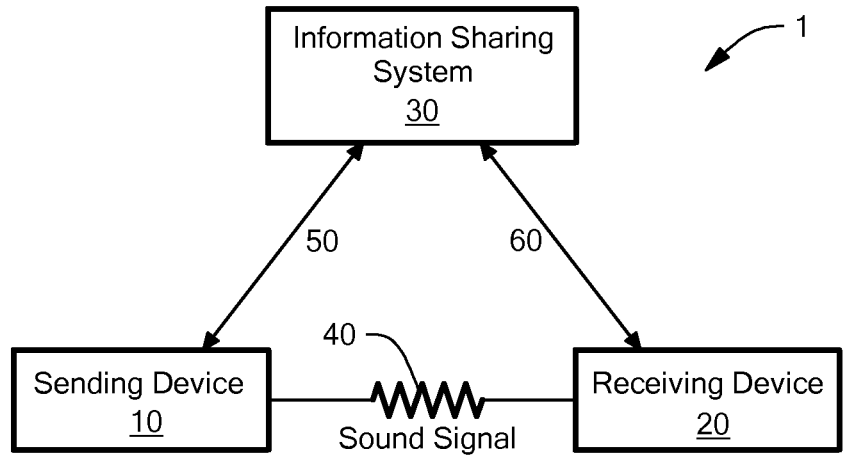
FIG. 1 is a block diagram of a system for sharing digital information that employs sound transmission for information sharing initiation, according to an embodiment of the invention.
Figure 2:
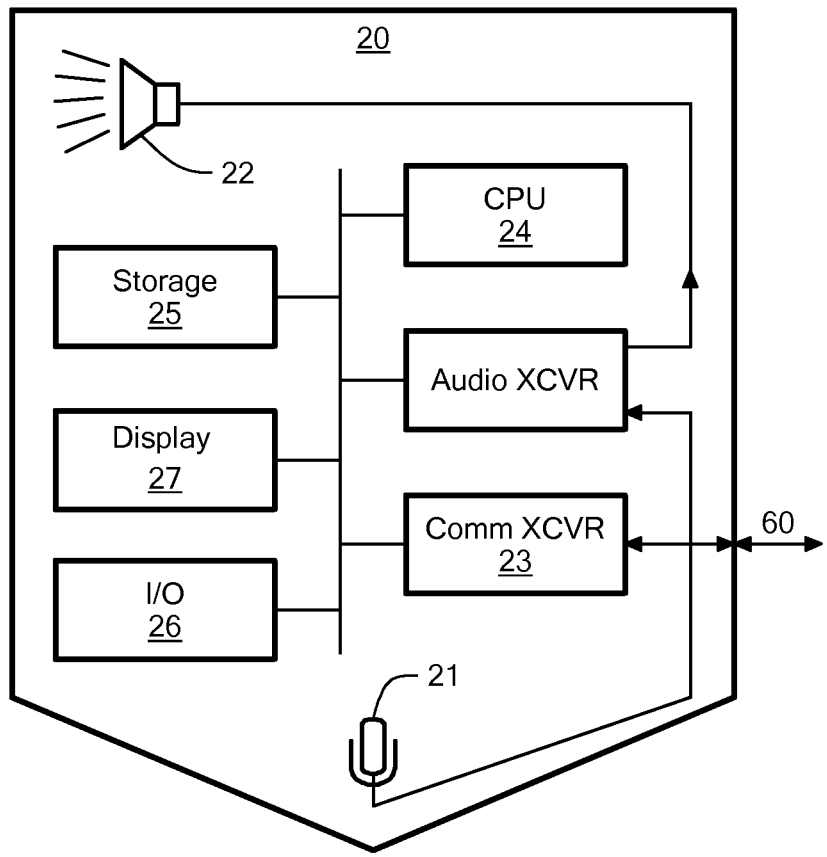
FIG. 2 is a block diagram of a receiving device for use with the system of FIG. 1.

FIG. 1 shows a block diagram of a system 1 for use in an embodiment of the invention. A sending device 10 transmits a sound signal 40 to a receiving device 20. Each device is connected via a communication link to an information sharing system ("ISS") 30. The communication links 50, 60 may use any medium (wired, wireless, infrared, sound, etc.) over which digital information can be transmitted. FIG. 2 is a block diagram of a receiving device 20 for use in an embodiment of the invention. The receiving device includes a microphone 21, may include a speaker 22, includes a transceiver 23 to connect to the communication link 60, a processor 24, storage 25 and an input device 26. The receiving device may also, optionally, include a display 27. The sending device 10 may include the same components as the receiving device 20 or, in particular embodiments may include, as a minimum, the means to reproduce a pre-recorded sound signal. The sending device 10 and the receiving device 20 may be, but need not be, identical devices. The ISS 30 includes storage for digital information, one or more communication links to communicate with various sending and receiving devices and at the least the processing capability to manage storing and retrieving data and to manage information transfers to sending and receiving devices. Thus, the ISS 30 could be a general purpose computer system with appropriate peripherals and communication links.

Figure 3:
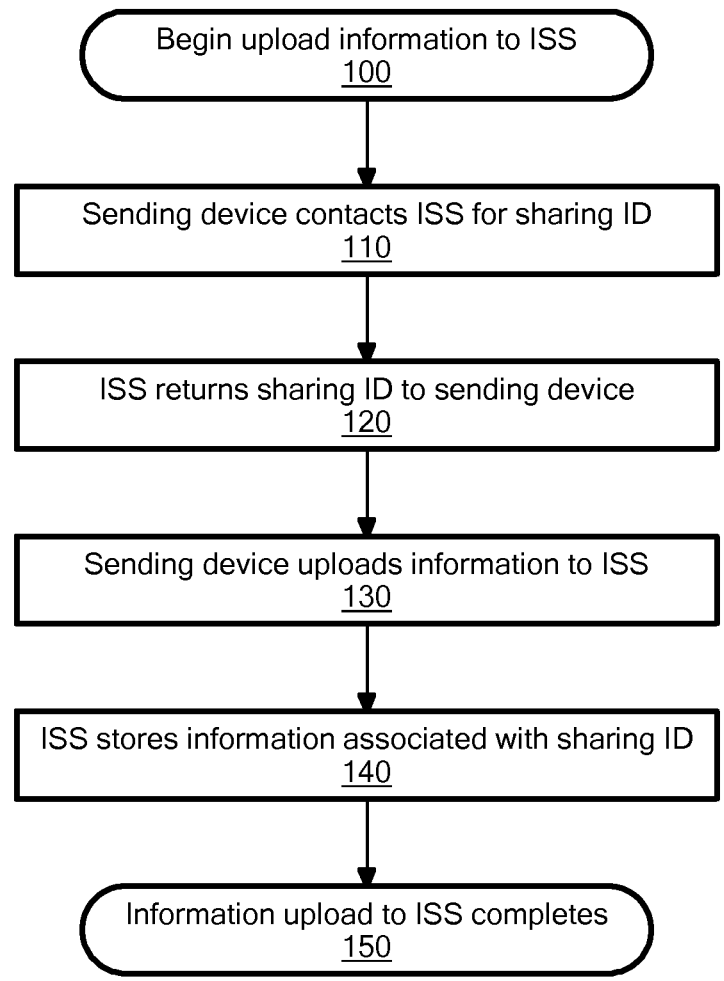
FIG. 3 shows a flow diagram for a method of uploading digital information to an information sharing system, according to an embodiment of the invention.

In an embodiment of the invention, a method 100 is provided for transferring digital information to a receiving device from a sending device via an ISS. The method can employ the system 1 that is illustrated in FIGS. 1 and 2. FIG. 3 is a flowchart for a portion of this method of transferring information. Upon user request, the sending device 10 contacts 110 the ISS 30 over a communication link 50 and requests the ISS to return a globally unique sharing ID to identify the digital information to the sending device 10 over the communication link 50. This user request can be entered at the sending device, for example, by activating the sharing software and entering commands that identify the ISS for the sharing operation and the file or other digital information to be shared. The ISS then transmits 120 the sharing ID to the sending device 10. The sharing ID is generated by the ISS so that it is a globally unique identifier for the sending device and the particular digital information to be shared. The sharing ID may contain the location of the ISS or the location of the ISS may be identified by other means, such as encoded in software at receiving devices. The sending device can then upload 130 the digital information to the ISS over the communication link 50 using any of a variety of file transfer protocols, e.g., FTP, as are known in the art. The ISS stores 140, 150 the information and associates the information with the sharing ID. Note that the information upload process can occur at any time prior to transfer of the information from the ISS 30 to the receiving device 20.

Figure 4:
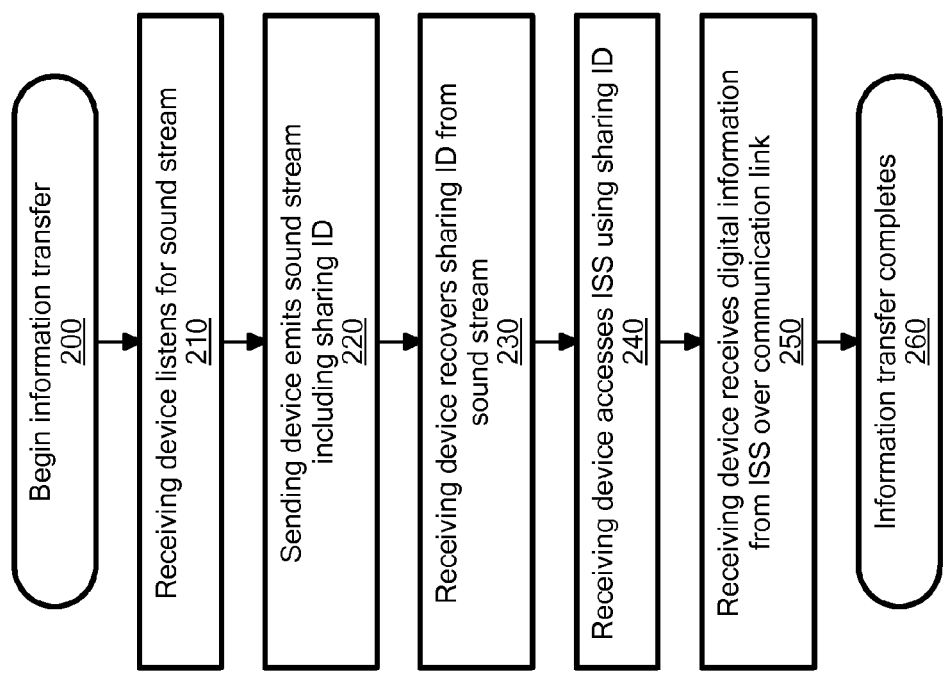
FIG. 4 shows a flow diagram for a method of initiating transfer of digital information to a receiving device from an information sharing system using an encoded sound stream as a triggering event, according to an embodiment of the invention.

As shown in FIG. 4, a user at the receiving device 20 activates a process 200, 210 that listens to incoming sounds via the microphone 21. The user at the sending device 10 can adjust the sound volume at its speaker so that the volume is appropriate for reaching the receiving device 20—i.e. high enough to be heard at the target receiving device but not so high that non-targeted devices can pick up the sound stream. The sending device 10 then emits a sound stream 220 according to an established protocol with the sharing ID embedded in the stream. For example, a method for communicating data via sound that could be used is described in US patent application publication no. 2003/0212549, which is incorporated herein by reference in its entirety. The receiving device 20 recognizes the sound stream and recovers 230 the sharing ID from the sound stream. The receiving device 20 then connects with the ISS 30 over the communication link 60 and sends the sharing ID to access 240 and receive 250 the digital information from the ISS 30 over the communication link 60. The transmission of the digital information to the receiving device 20 can be according to any of the various file transfer protocols for digital information that are known in the art.

In particular embodiments of the invention, user interaction at the receiving device is not required to initiate information sharing. The receiving device 20 can be preconfigured to listen to sound streams via its microphone 21. When a sound stream that encodes a sharing ID is received, the device 20 automatically recognizes the sharing ID, contacts the ISS 30 associated with the sharing ID, and transfers the information to the receiving device 20.

In an exemplary embodiment of the invention, the sound stream is encoded by mixing audible sound tones that represent digital codes. The tones are kept sufficiently apart in frequency to ensure that sampling errors can be minimized. Simple sine-wave generation is used for each frequency. The sine-wave outputs from the generator are added and then averaged to get the final sound sequence. In another specific embodiment of the invention, rather than mixing the sound tones to form the sequence, the sound tones are played separately in a sequence, like a song. Sound stream thus generated include a preamble and a postamble to allow the receiving device to determine the start and the end of the control information transfer. The sound stream may include error detecting and correcting information to ensure a reliable transfer, as is known in the art.

For decoding the sound stream, half-second samples from the microphone are received and run through a discrete Fourier transform ("DFT"). The 'amount' or 'volume' of each frequency heard in that sample is placed into a list. From that list, the loudest tone can be determined. If frequencies outside of the bands of interest (the potential frequency pool) are too loud, the sound stream is again processed assuming either the sound was not played, or there is too much background noise. Otherwise, the frequencies of interest are filtered and the loudest frequencies determined—depending on the generation and mixing method used in the stream as described above. If the stream includes a mix of sounds tones, the top number of frequencies according to volume are identified and used. Adjacent frequency volumes are added into the bands of interest, in case timing is off by a small amount. For example, 258 kHz through 262 kHz is counted as 260 kHz. If the encoded stream contains tones in sequence (i.e., a "song"), the frequency with the loudest volume is identified, then the stream is sampled until a loud tone is not present (i.e., silence) and then the stream is searched for the next loud tone. In this fashion, the digital information corresponding to the encoded sound stream is reconstructed at the receiving device 20. This method of sound encoding and decoding may be employed in the various embodiments of the invention, but other sound encoding and decoding schemes may also be employed as are known in the art.

In some embodiments of the invention, the sending device 10, when it requests the sharing ID from the ISS 30, or at a later time, specifies a time period during which the sharing ID is valid. If a request from a receiving device 20 arrives outside the specified time period, the ISS 30 will refuse to transmit the digital information to the receiving device 20. The ISS 30 may inform the receiving device 20 that the request to transfer information has been received outside the valid time window. The sending device 10 may inform the receiving device 20 via the initial sound stream with the sharing ID that the transfer is limited to a specific time period. Limiting transfers to a specific time period can be useful in securing the information from unauthorized access.

In other preferred embodiments of the invention, the sending device 10, when it requests the sharing ID from the ISS 30, or at a later time, specifies a geographical area for which the sharing ID is valid. When the sending device provides the sharing ID to the receiving device, the sound stream can indicate if information transfers are limited to receiving devices within a specific area. If so, the receiving device, when it contacts the ISS provides its current location. This location can derived, for example, from the sending device's global positioning system, cell tower triangulation, wi-fi access point location, etc. If a request from a receiving device 20 outside the specified geographic area arrives, the ISS 30 will refuse to transmit the digital information to the receiving device 20. The ISS 30 may inform the receiving device 20 that the receiving device is outside the allowed geographic area. Limiting transfers to a specific geographic area can be useful in securing the information from unauthorized access.

In further preferred embodiments of the invention, the user at the sending device 10 requests that the digital information be encrypted. The user supplies a password and the sending device encrypts the digital information transferred to the ISS 30. The user at the sending device then provides the password to a user at the receiving device via verbal communication or some other external communication means. When the receiving device 20 processes the sound stream from the sending device that includes the sharing ID, the sound stream includes an indicator that the digital information is encrypted. If there is an indicator that the information is encrypted, the receiving device 20 prompts the user to enter the password at the receiving device and the password is used to decrypt the information.

Figure 5:
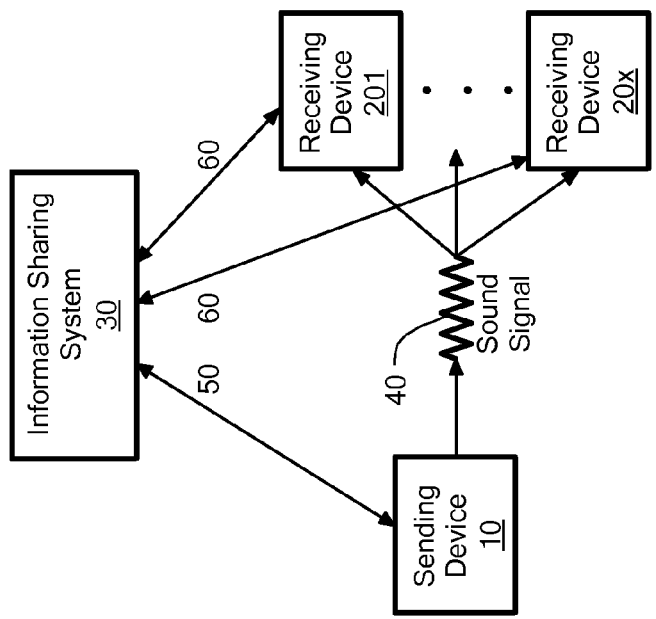
FIG. 5 is a block diagram of a system for sharing digital information that employs a sound transmission broadcast to initiate reception of the information at a plurality of receiving devices, in another embodiment of the invention.

FIG. 5 shows a variation of the system of FIG. 1 that includes multiple receiving devices, for use in another preferred embodiment of the invention. While each of the multiple receiving devices (201, . . . , 20X) need not be the same, each device will have at least the features described for the receiving device 20 shown in FIG. 2. Each of the receiving devices (201, . . . , 20X) includes a microphone to listen to the sound signal broadcast by the sending device 10. The sending device 10 broadcasts a sound stream according to an established protocol with one or more sharing IDs embedded in the stream. The receiving devices (201, . . . , 20X) listen to the broadcast sound stream, decode the stream and recover the one or more sharing IDs embedded in the stream. Upon user request, or automatically in some specific preferred embodiments of the invention, one or more of the multiple receiving devices (201, . . . , 20X) then connects with the ISS 30 and uses the sharing ID to access and receive the digital information from the ISS 30 over a communication link 60. The transmission of the digital information to the receiving devices can be according to any of the various file transfer protocols for digital information that are known in the art. These transfers could include any of the time limitations, geographic limitations or encryption described above in connection with the single receiving device system.

In some embodiments of the invention, the sending device 10 serves only to disseminate a prearranged sharing ID to one or more receiving devices. The ISS 30 receives the data from another source and associates a prearranged sharing ID with this data. For example, a sound player, such as a tape recorder could play a prerecorded lecture with sharing IDs embedded at various points in the lecture. The listeners could then use their receiving devices 20 to download information, such as slides, reference papers, instructions, uniform resource locaters, etc to receiving devices.

In some embodiments of the invention, the sending device 10 transmits metadata in the sound stream along with the sharing ID to the receiving device 20. This metadata could contain information such as name of the share, tags, maximum number of downloads or any other meta-data that is useful to applications that implement this sharing method. The receiving device decodes the metadata and acts accordingly. In a specific embodiment, the metadata includes the location of the ISS from which the digital information is to be transferred.

In other embodiments of the invention, other physical media, such as, for example, light waves or infrared radiation could be substituted for sounds waves to transfer a sharing ID from a sending device to a receiving device. For example, the sending device could display a pattern encoded with a sharing ID on its display screen. A user could use the camera on a smartphone to scan the display and read the sharing ID. The receiving smartphone could then transfer the digital information associated with the sharing ID from the ISS to the smartphone. Physical media that effectively limit the distance that the receiving device can be from the sending device are particularly useful in controlling access to the information to be shared.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in the appended claims.

What is claimed is:

1. A method for receiving digital information at a first receiving device, the information received from a sending device via an information sharing system, the first receiving device including a computer processor, the method comprising:

using a microphone of the first receiving device, receiving an acoustic sound signal emitted by the sending device, the acoustic sound signal indicating a request to transfer the digital information to the first receiving device, the acoustic sound signal including a sharing identifier; and using the first receiving device, sending the sharing identifier to the information sharing system and receiving the digital information from the information sharing system.

2. The method according to claim 1, further comprising:
using the first receiving device, transmitting a second acoustic sound signal to the sending device indicating that the first receiving device will access the information sharing system to receive the digital information.

3. The method according to claim 1, further comprising:
using the receiving first device, entering a password, and wherein receiving the digital information from the information sharing system includes decrypting the information using the password.

4. The method according to claim 1 wherein receiving the digital information from the information sharing system includes performing the transfer during a specified time period.

5. The method according to claim 1, further comprising:
using the first receiving device, providing the location of the first receiving device to the information sharing system and
wherein receiving the digital information from the information sharing system requires that the location of the first receiving device is within a specified geographic area.

6. The method according to claim 1, wherein the acoustic sound signal received from the sending device includes metadata about the digital information.

7. The method according to claim 1 further comprising:
using a second receiving device, receiving the acoustic sound signal from the sending device; and
using the second receiving device, sending the sharing identifier to the information sharing system and receiving the digital information from the information sharing system.

8. A method for transferring digital information to a receiving device, the information received at the receiving device from a sending device via an information sharing system, each of the receiving device and the sending device including a computer processor, the method comprising:

using the sending device, receiving a sharing identifier from the information sharing system in response to a request from the sending device and transmitting the digital information to the information sharing system for association with the sharing identifier; and using a speaker, emitting an acoustic sound signal indicating a second request to transfer the digital information to the receiving device, the acoustic sound signal encoding the sharing identifier.

9. The method according to claim 8, wherein the request from the sending device to the information sharing system identifies at least one of: a time period allowed for the information transfer and a geographic extent allowed for the location of the receiving device during the information transfer.

10. A computer program product for use on a first receiving device for receiving digital information, the information received from a sending device via an information sharing system, the computer program product comprising a nontransitory computer readable medium encoded with computer readable program code, the computer readable program code including:
   program code for, using a microphone of the first receiving device, receiving an acoustic sound signal emitted by the sending device, the acoustic sound signal indicating a request to transfer the digital information to the first receiving device, the acoustic sound signal including a sharing identifier; and
   program code for, using the first receiving device, sending the sharing identifier to the information sharing system and receiving the digital information from the information sharing system.

11. The computer program product according to claim 10, the computer readable program code further including:
   program code for, using the sending device, receiving the sharing identifier from the information sharing system and transmitting the digital information corresponding to the sharing identifier to the information sharing system.

12. The computer program product according to claim 10, the computer readable program code further including:
   program code for, using the sending device, transmitting to the information sharing system at least one of: a time period allowed for the information transfer and a geographic extent allowed for the location of the receiving device during the information transfer.

13. The computer program product according to claim 10, the computer readable program code further including:
   program code for, using the first receiving device, transmitting a second acoustic sound signal to the sending device indicating that the first receiving device will access the information sharing system to receive the digital information.

14. The computer program product according to claim 10, the computer readable program code further including:
   program code for, using the receiving first device, entering a password; and
   wherein receiving the digital information from the information sharing system includes decrypting the information using the password.

15. The computer program product according to claim 10, wherein receiving the digital information from the information sharing system includes performing the transfer during a specified time period.

16. The computer program product according to claim 10, the computer readable program code further including:
   program code for, using the first receiving device, providing the location of the first receiving device to the information sharing system, and
   wherein receiving the digital information from the information sharing system requires that the location of the first receiving device is within a specified geographic area.

17. The computer program product according to claim 10, wherein the acoustic sound signal received from the sending device includes metadata about the digital information.

18. The computer program product according to claim 10, the computer readable program code further including:
   program code for, using a second receiving device, receiving the acoustic sound signal from the sending device; and
   program code for, using the second receiving device, sending the sharing identifier to the information sharing system and receiving the digital information from the information sharing system.

* * * * *